June 15, 1943.     H. S. BUCKMAN     2,321,795
NUT CRACKING MACHINE
Filed Nov. 14, 1941     2 Sheets-Sheet 1
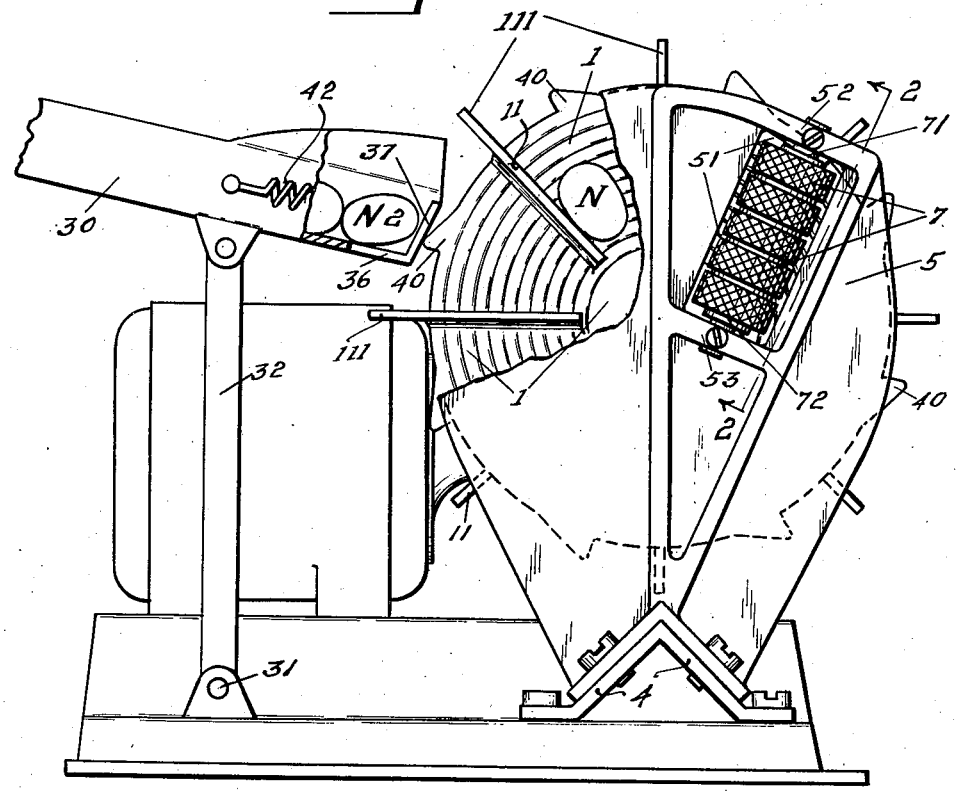
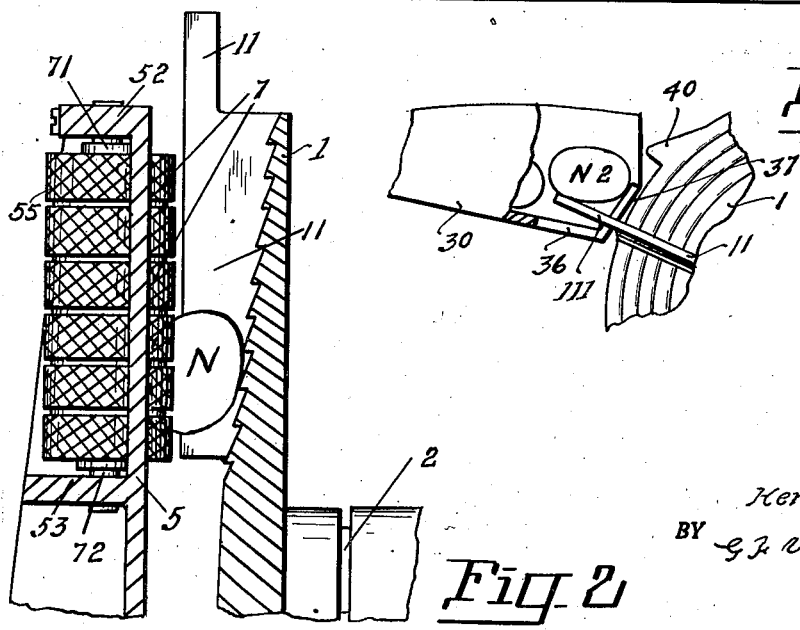
INVENTOR.
Herbert S. Buckman
BY G. F. McDougall
ATTORNEY.

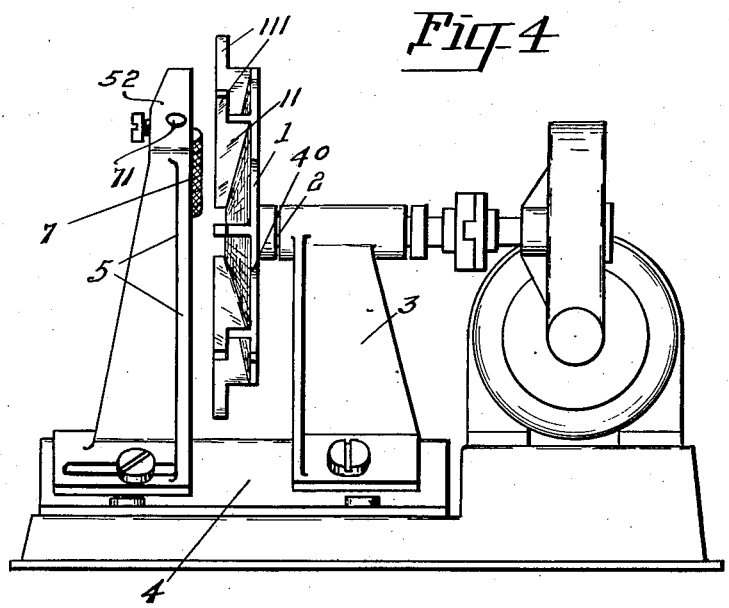
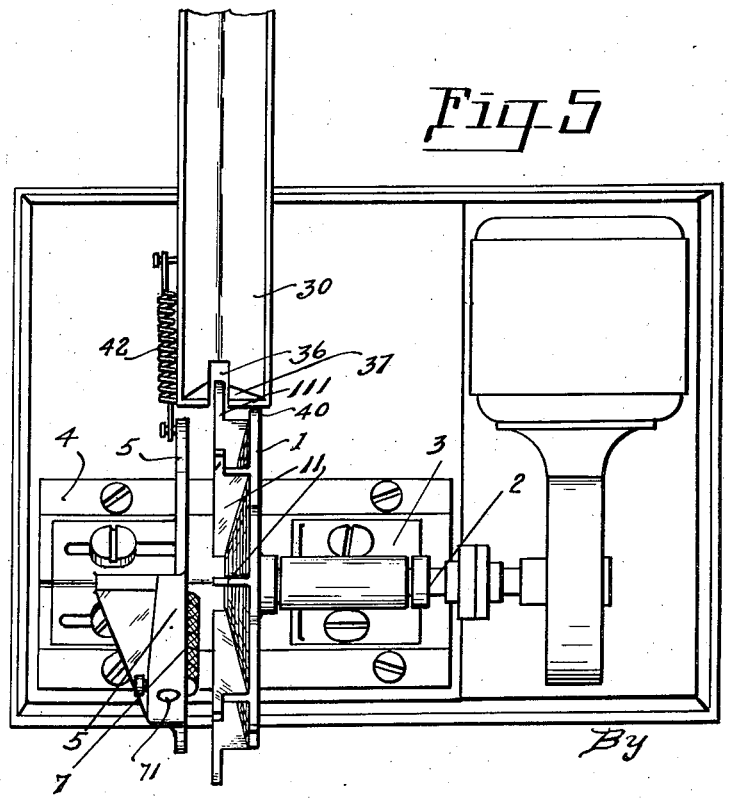

Patented June 15, 1943

2,321,795

UNITED STATES PATENT OFFICE 2,321,795

NUT CRACKING MACHINE

Herbert S. Buckman, Seattle, Wash.

Application November 14, 1941, Serial No. 419,156

8 Claims. (Cl. 146—11)

This invention relates to a nut cracking machine operated by power. More specifically it relates to a power operated nut cracking machine employing a limited compression of the nut shell; that is to say the nut shell containing the kernels or meats is compressed just sufficiently to fracture the shell and release the kernels, but so limited is its action that the kernels will for the most part remain whole.

I am aware that a machine has been proposed consisting essentially of conical faced discs revoluble with a shaft upon which they are mounted, there being a relatively stationary plate normal to the axes of the shaft and disc, the nuts being compressed between the moving and stationary parts. Another proposes two conical discs facing each other, but run at different speeds; but in both of these machines, nut meats can and do drop down from a cracked nut to where the parts approach very closely together and are themselves crushed.

In the case of filberts and other nuts having a whole kernel, anything less is of low value in the market. Walnut meats in halves are worth much more by the pound than quarters, otherwise of the same quality; hence it is an object of the present invention to crack a shell just enough so the fracture will release all of the contents without generally injuring the salable kernels.

It is another object of the invention to produce means that give the same fracturing squeeze to a nut shell irrespective of its size and to then immediately pass the fractured shell and contents out of the zone where further compressive contact could further break the edible kernel.

It is a further object to provide a machine able to take a haphazard run of nuts of varying sizes, apply a shell fracturing squeeze to each nut separately to attain the ends heretofore stated, and yet have a capacity large enough to be commercially important.

I attain the objects expressly stated and others that will be apparent to those familiar with the requirements of such a machine, by the structure hereinafter described in detail, reference being had to the accompanying drawings which form a part hereof and illustrate the best form of the invention at present known, and which is believed to employ a mechanical principle not before known or used, that is the single and practically instantaneous compressive contact, uniform without regard to the size of the nut.

In the drawings—

Fig. 1 is a side view of the invention, with parts broken away to more fully disclose its construction;

Fig. 2 is a sectional view of a portion of Fig. 1 taken at 2—2 in that figure;

Fig. 3 is a view showing in more complete detail just how the single nut selector operates;

Fig. 4 is a view of the machine shown in Fig. 1 viewed from the right hand side of that figure; and Fig. 5 is a plan of the form shown in Fig. 4.

Further describing the drawings:

1 is a conical faced revoluble disc, rigidly mounted on a shaft 2 and supported by the pedestal 3 and furnished with an appropriate power drive, one being shown but which will not be further described as it is conventional.

A base 4 supports the pedestal 3 and also supports a face-plate 5, adjustably mounted thereon in such manner that the face of the face-plate 5 confronts the conical disc 1, being large enough to completely shield the disc proper when the machine is viewed from the rear of the disc. The plane of the face-plate is normal to the axis of the disc 1 and the shaft 2. The face of the face-plate 5 is smooth and preferably polished. The face-plate 5 is provided with a rectangular opening 51 and bearings 52 and 53. A suitably surfaced dead cracking roll 7 is equipped with a pair of axially placed shaft mountings 71 and 72, and the body thereof is of such proportions that when the shaft mountings 71 and 72 are revolubly mounted in the bearings 52 and 53, the cracking roll 7 is freely turnable in the rectangular opening 51, projecting a portion of its arcuate surface beyond and in parallel relationship to the face-plate 5. Since the dead cracking roll is mounted upon the face-plate body and projects through it, it is also adjustable with respect to the conical face of the disc 1 without changing its relationship to the face of the face-plate 5.

An important feature of the mounting of the cracking roll 7 is clearly shown in Fig. 1. As any radial line of the disc 1 revolves past the cracking roll 7, the axis of the cracking roll intersects that radial line at an acute angle, so as seen in Fig. 1, the cracking roll co-operates with the conical disc in the upper right hand quadrant of the disc in such manner that the milled surface of the cracking roll indicated by numeral 55 tends to pull a nut in instead of to slide it upwardly and outwardly. This also contributes materially to clearance of the cracked nut so the edible portion thereof is not further squeezed after the instant the shell is fully cracked.

It may be noted that the distance between the cracking roll 7 and the face of the conical disc 1 increases in proportion to the distance from the center of the disc, the variation being for the accommodation of variable sizes of nuts.

Mounted securely on the face of the disc 1, are a plurality of radial blades 11, so fashioned that the external edges thereof will run in a plane parallel to the face of the face-plate 5 when the disc is revolved. These blades 11, divide the conical face of the disc 1 into a plurality of sector shaped compartments by reason of the proximate coverage by the face-plate 5, and it will be seen that if a nut is dropped into one of these compartments as represented by "N," Fig. 1, it will be carried smoothly around the circumferential zone which its size permits it to reach until it is brought into contact with the knurled dead roll 7, which cracks it because it sets closer to the disc than does the face-plate 5. It will be also seen that once the nut passes under the roll 7, it and its contents have had all of the processing they are going to get and may drop perfectly free as the blade supporting them attains a downward slant.

Means are provided for assuring that only one nut at a time is put into the machine and that one in its own compartment; the reason being the inequality of size. If a smaller nut goes into a compartment above a larger one, it will be cracked insufficiently or not at all.

The means for selecting one nut at a time as stated, may very conveniently be a feed spout 30, wide enough to take nuts in a single row but not wide enough to take two. This will be mounted for reciprocation on the rock arm 32, pivoted at 31. It will be driven backwards by cams 40 on the disc 1 or by any other convenient means, returning by influence of the spring 42.

When it is at rest, a selector extension 111 of the radial blade 11 will pass through the slot 36 and lift the end nut N2 over the barrier 37, whereupon it will roll down the inclined upper surface of the radial blade 11 in position to receive it, falling such distance toward the center of the disc 1 as its size will permit, being in contact with the smooth face of the face-plate and the face of the conical disc, to pass between the disc and the roll, receiving its squeeze which will be of identical amount whether it is in shallow or deep, as is well illustrated in Fig. 2.

Having disclosed my invention and the best embodiment of it so that anyone skilled in the art can reap its advantages, what I claim is:

1. A nut cracking machine comprising a revoluble conical disc, a stationary face-plate provided with a roller opening spaced from and confronting the disc, radial blades made rigid with the face of the disc and arranged to subdivide the space between the disc and face-plate into sector-like compartments, a freely revoluble cracking roller mounted to project a portion of its surface through the face-plate into the space between the disc and face-plate and means for feeding nuts into the compartments to be subsequently cracked between the cracking roller and the disc.

2. A nut cracking machine comprising a revoluble conical disc, a stationary face-plate with a roll opening therein spaced from and confronting the disc, radial blades made rigid with the face of the disc and arranged to subdivide the space between the disc and face-plate into sector-like compartments, a free running cracking roller mounted to project a portion of its cylindrical surface through the opening in the face-plate into the space between the disc and face-plate, and means for feeding a single nut into each compartment as the disc revolves, to be subsequently cracked between the cracking roller and the disc.

3. A nut cracking machine comprising a revoluble conical disc, a stationary face-plate spaced from and confronting the disc provided with a roll opening therethrough, radial blades made the disc and face-plate said roller freely turn rigid with the face of the disc and arranged to subdivide the space between the disc and face-plate into sector-like compartments, a roller mounted to project a portion of its surface through the face-plate into the space between able by a nut carried in a compartment passing said roller and means for feeding nuts into the compartments to be subsequently cracked between the cracking roller and the disc.

4. A nut cracking machine comprising a revoluble conical disc, a stationary face-plate provided with a roll opening spaced from and confronting the disc, radial blades made rigid with the face of the disc and arranged to subdivide the space between the disc and face-plate into sector-like compartments, a roughened cracking revoluble roller mounted to project a portion of its surface through the face-plate into the space between the disc and face-plate, and means for feeding a single nut into each compartment as the disc revolves, to be subsequently cracked between the cracking roller and the disc.

5. In a nut cracking machine, a revoluble conical disc, a stationary face-plate with a roller opening therethrough spaced from and confronting the disc, radial blades made rigid with the face of the disc subdividing the conical face thereof into a plurality of sector-shaped compartments, closed by the face-plate to hold a nut, a revoluble roller mounted behind and partially projecting through the face-plate into the space between the face-plate and the disc, and means for feeding a single nut into each compartment as it traverses the first upper quadrant of disc revolution, the revoluble roller angularly placed facing the next upper quadrant to crack each nut as it is carried past by the disc and a radial blade.

6. In a nut cracking machine comprising a revolubly mounted conical disc, radial blades made rigid with the disc to subdivide the conical face thereof into a plurality of sector-shaped compartments, a stationary face-plate confronting the compartments and spaced therefrom to retain nuts of different sizes in different zones of the compartments, a cracking roll mounted for revolution on the back of the face-plate with a part of its surface projecting therethrough to contact carried nuts, characterized by the cracking roll being so mounted that its axis is always at such an acute angle to a radial blade passing the roll that the roll tends to hold a nut carried by the blade from slipping outwardly.

7. In a nut cracking machine, a conical faced revoluble disc, nut carrying radial blades defining sector-like nut carrying compartments on the face of the disc, a stationary face-plate spaced in parallel relationship to the plane of rotation of the disc and positioned to retain nuts in the compartments, a cracking roller mounted for turning by influence of contact with a carried nut on the reverse side of the face-plate with a portion of its cylindrical surface projecting into the space between the disc and plate, means for feeding nuts into the compartments after entrance into the first upper quadrant of disc revolution, the cracking roller being positioned opposite the other upper quadrant to crack carried nuts between the disc and the roller.

8. In a nut cracking machine, a conical faced revoluble disc, nut carrying radial blades defining sector-like nut carrying compartments on the face of the disc, a stationary face-plate having a roller opening spaced in parallel relationship to the plane of rotation of the disc and positioned to retain nuts in the compartments, a frictionally revoluble cracking roll mounted on the reverse side of the face-plate with a portion of its cylindrical surface projecting through the opening into the space between the disc and plate, and means for feeding nuts into the compartments after said compartments pass into the first upper quadrant of disc revolution, the cracking roll positioned opposite the other upper quadrant with its axis asymmetrical to the axes of the radial blades.

HERBERT S. BUCKMAN.